Feb. 23, 1932.   J. L. ROBBINS   1,846,756

COMBINED EGG TRAY SUPPORT AND CANDLING DEVICE

Filed May 13, 1930

Inventor
John L. Robbins.
By
Attorney

Patented Feb. 23, 1932

1,846,756

UNITED STATES PATENT OFFICE

JOHN L. ROBBINS, OF DENVER, COLORADO

COMBINED EGG TRAY SUPPORT AND CANDLING DEVICE

Application filed May 13, 1930. Serial No. 451,929.

This invention relates to improvements in egg tray supports of the type employed in hatcheries.

In hatcheries where a large number of eggs must be transferred from shipping cases to trays and where a large number of eggs must be candled, it is necessary to have a support for convenience in performing these operations efficiently and easily.

It is the object of this invention to produce an egg tray support that shall be provided with means for supporting a large number of trays as well as for supporting a case of eggs adjacent to the trays so that the eggs may be conveniently transferred from the case to the trays.

Another object of this invention is to produce an egg tray support that shall also be provided with means whereby the eggs may be conveniently candled so as to remove any infertile eggs.

Another object of this invention is to provide an egg tray support that shall be so constructed that two people can conveniently work at it and it shall be provided with casters by means of which it can be readily transported from place to place.

The above and other objects that may become apparent as the description proceeds are obtained by means of a construction and an arrangement of parts that will now be described in detail, reference for this purpose being had to the accompanying drawings in which the preferred embodiment of the invention has been illustrated, and in which.

Figure 1:
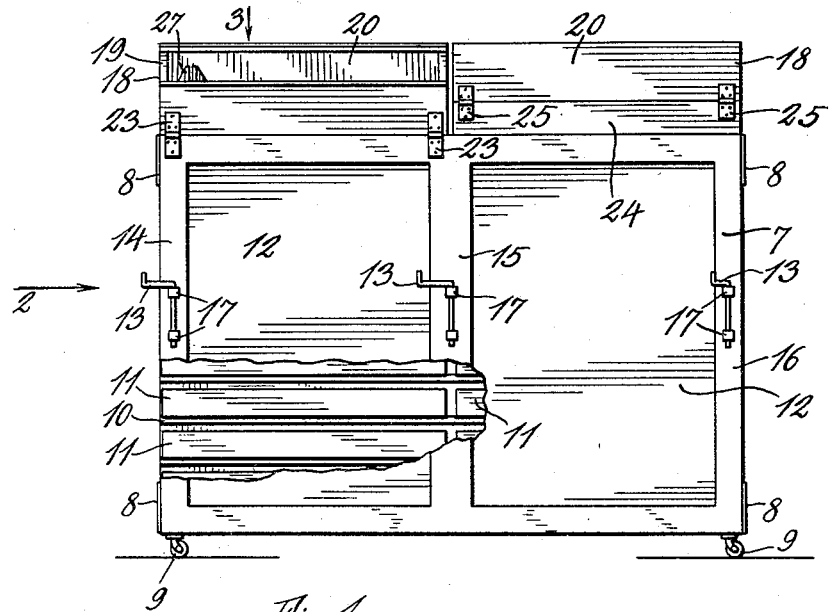
Fig. 1 is a side elevation of my improved support, parts thereof being broken away to better show the construction.
Figures 2, 3:
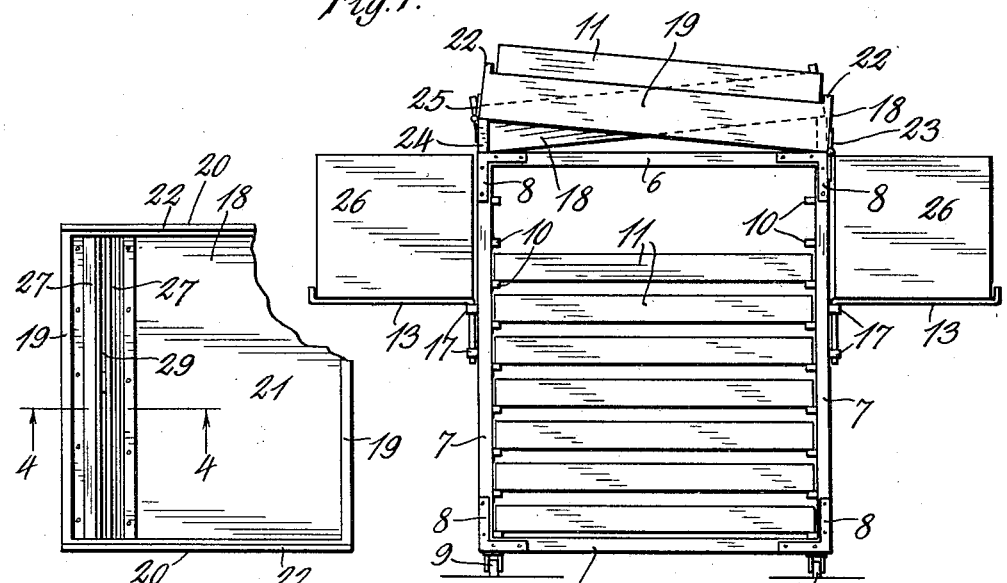
Fig. 2 is an end view of the support showing the parts arranged for transferring eggs from the cases to the trays.
Fig. 3 is a top plan view of the tray supporting box and shows the location of the egg candling device.

The improved support consists of a rectangular casing having a bottom 5, a top 6 and sides 7. This casing is provided with reenforcing members 8 at its corners and is supported on casters 9 so that it may be readily transported from place to place. The casing is open at both ends and is provided with a number of cleats 10 that extend from one end to the other and which serve as supports for the end trays 11. The length of the casing is substantially equal to twice the length of the egg trays that are employed in connection with it. The sides 7 are preferably constructed with panels 12 and are each provided with three brackets 13 that are hingedly connected to the vertical side members 14, 15 and 16 by means of clamps 17. Supported on the top of the rectangular casing are two egg tray supports 18 that are made in the form of boxes having ends 19 and sides 20. Each of these boxes is also provided with a bottom 21. The sides 20 have guide members 22 extending upwardly a short distance above the upper edges of the ends 19 and these serve as guides for the egg trays 11 when they are supported on the same. Each egg tray support 18 has one side 20 connected with the corresponding side of the rectangular casing of the support by means of hinges 23. The opposite side is provided with a support 24 that is connected to it by means of hinges 25. These supports are adapted to be turned down into the position shown in Figure 2 in which position they support that side of the box 18 in a transversely inclined position, which makes it more convenient to place the eggs in the tray 11. When the device is used for candling eggs or for other purposes where the supports 18 do not need to be inclined, members 24 can be folded upwardly against the side 20, thus permitting the boxes or supports 18 to rest in horizontal position against the upper surfaces of the top 6. When trays are to be filled, the eggs are contained in the shipping cases 26, that are supported on the brackets 13 and a tray is put into position on the support 18 as shown in Figure 2, and the eggs can then be conveniently transferred from the shipping case to the tray. After the tray has been filled, it is removed and supported on a pair of cleats 10 on the inside of the casing, after which a new tray is put into place. When all the trays have been filled with eggs, the support can be moved into position adjacent the incubator and the trays transferred from the support to the incubator.

It will be seen from the above description that by means of this device eggs can be conveniently transferred from the cases to the trays at any position in the hatchery and the filled trays can then be brought into position adjacent the incubator so that they can be transferred with the least amount of labor and inconvenience to their final position in the incubator.

Figure 4:
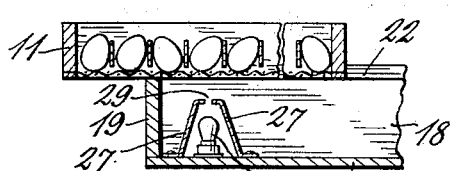
Fig. 4 is a section taken on line 4—4, Fig. 3 and shows the position of an egg tray during the process of candling.

After the eggs have been in the incubator for a few days, they must be candled so as to enable the operator to remove the infertile eggs and for this purpose the supports or boxes 18 have been provided with a housing comprising two members 27 that enclose an electric lamp 28 and which have a long narrow slot 29 at the top, so that the light will emerge through this slot. In the drawings the lamp has been shown as an ordinary incandescent lamp, but in the actual construction, the lamp employed is of the type having a long, straight filament and which are sometimes referred to as "line-o-lite" lamps. A tray is put into position in the manner shown in Figure 4 and a row of eggs located directly above the slot 29 and if the room is dark, the operator can readily detect the infertile eggs and remove them from the trays. These eggs are deposited in the box 18 from which they are later removed. By the candling mechanism shown and described, a tray of eggs can be very quickly candled, thereby greatly simplifying this operation, which would be very tedious if performed in the usual way. The housing containing the lamp 28 has been shown as formed from sheet metal, but any material suitable for this purpose can be used, and if it is found that too much heat is radiated by the metal housing, it can be covered by some suitable heat insulating material or can be constructed of some heat insulating material, instead of from metal.

The support illustrated and described is composed substantially of two identical sections, which, however, have been constructed as a single unit, and it is therefore the same at each end and this permits two people to work simultaneously and with equal comfort and at the same time forms a device having twice the capacity of a single unit of this type.

From the above description it will be seen that the device is of very simple construction and is so designed that it can be put into position for supporting egg trays in a manner whereby the eggs can be transferred to the trays in the most convenient way and which is also provided with means for detecting and removing infertile eggs.

Having described the invention what is claimed as new is:

1. A device of the class described, comprising, in combination, a hollow support of rectangular cross section having two spaced vertical walls, the opposing sides of the spaced walls being provided with spaced cleats, or the like, for supporting egg trays, a tray supporting box located on top of the hollow support, one edge of the box being attached to the upper edge of the hollow support by means of hinges, and a support hingedly connected with the other side of the box and adapted to be turned through an angle of one hundred eighty degrees.

2. A device of the class described, comprising, in combination, a hollow support of rectangular cross section having two spaced vertical walls, the adjacent sides of which are provided with spaced cleats, or the like, for supporting egg trays, a tray supporting box located on top of the hollow support, one edge of the box being attached to the upper edge of one of the vertical walls by means of hinges, the sides of the box extending above the ends and provided with rabbets on their inner upper corners, said rabbets forming guides for egg trays and means comprising a board hinged to the other side of the box for holding the box in tilted position.

In testimony whereof I affix my signature.

JOHN L. ROBBINS.